J. VAN VRANKEN.
PLOW DISK.
APPLICATION FILED FEB. 21, 1912.

1,043,175.

Patented Nov. 5, 1912.

Witnesses:
John Enders
J. V. Curran

Inventor:
Jay Van Vranken,
by Wallace R. Lane
Atty.

UNITED STATES PATENT OFFICE.

JAY VAN VRANKEN, OF DAVENPORT, IOWA.

PLOW-DISK.

1,043,175.  Specification of Letters Patent.  Patented Nov. 5, 1912.

Application filed February 21, 1912. Serial No. 679,152.

*To all whom it may concern:*

Be it known that I, JAY VAN VRANKEN, a citizen of the United States, residing at Davenport, in the county of Scott and State of Iowa, have invented new and useful Improvements in Plow-Disks, of which the following is a specification.

It is the object of my present invention to provide a rotary disk or cutter adapted for use in plowing earth, and particularly to provide a disk so shaped and proportioned as to efficiently turn the earth when the disk forms part of a self-propelled or engine driven plow.

The plow disk herein described and claimed, may be used as a part of various kinds of power driven plows and although a disclosure of such plows is not necessary to a complete understanding of the present invention, one such plow is shown in my copending application, Serial No. 637,612, filed July 10, 1911.

The details of my invention will be better understood by reference to the following description, taken in conjunction with the accompanying drawings, wherein—

Figure 1:
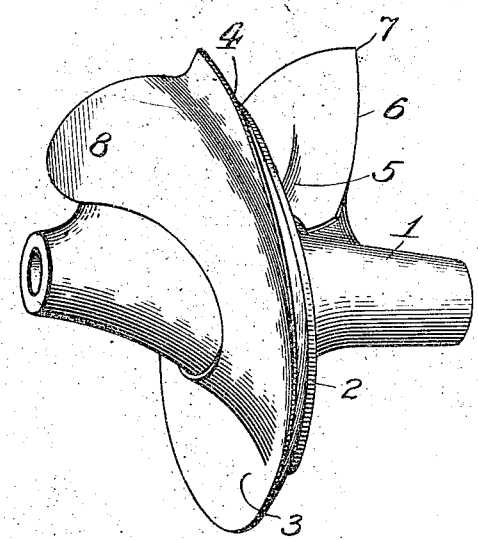
Figure 2:
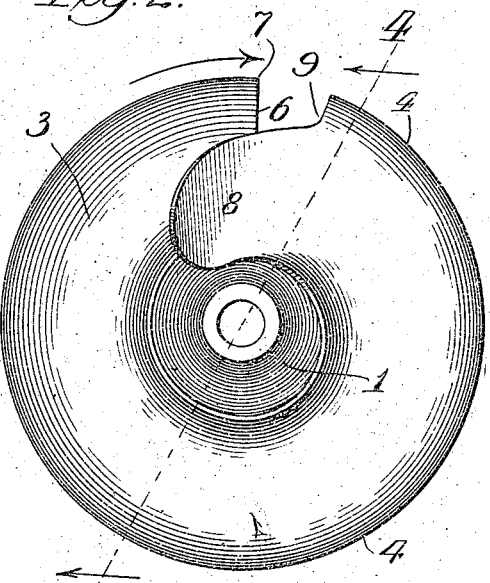
Figure 3:
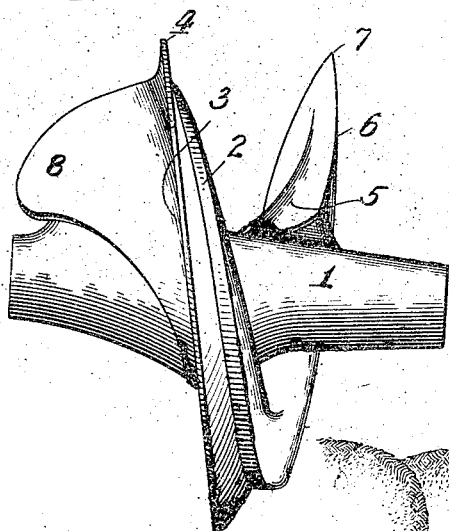

Figure 1 is a perspective view of one of the plow disks. Fig. 2 is an end view of the same. Fig. 3 is a front elevation, and Fig. 4 is a sectional elevation on a line 4—4 of Fig. 2.

In the construction shown, the disk comprises a central hub 1 of cast iron adapted for attachment in suitable manner to a drive shaft (not shown) and carrying on its periphery a helical flange 2 integral with the hub and concave along one face to serve as a socket or support for a helical steel shoe or face 3.

Figure 4:
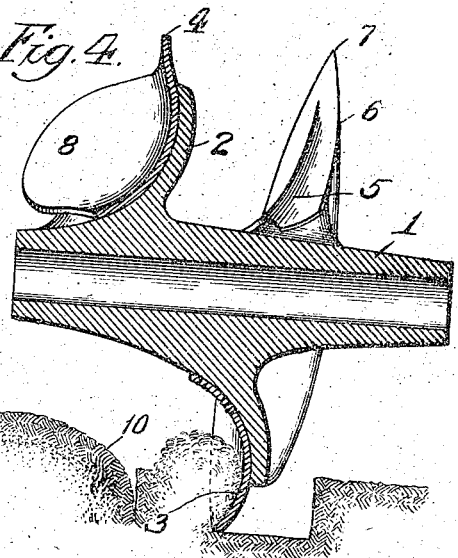

The steel shoe 3 is of helical outline, as shown in Fig. 1 and projects somewhat beyond the supporting cast iron, as shown in Fig. 4, to form a cutting edge 4. The body of the shoe is concaved throughout its length, and, excepting at its extreme front and rear ends, is of regular and uniform curvature. At the front end of the shoe the concaved surface is warped down at 5 (Fig. 3) so that the front or sharpened cutting edge 6 of the disk lies substantially in a straight line radial to the hub and in a plane at right angles or transverse to the axis of the hub. When the disk is in normal use, the outer corner 7 enters the soil ahead of other parts of the disk so that the radial sharpened edge 6 serves as a cutting edge to free the soil and start it on its transverse or sidewise movement. Further rotary and forward movement causes the disk to cut obliquely across the furrow, simultaneously transporting and inverting the material, as illustrated in Fig. 4, and ultimately delivering it bottom side up beyond the trailing end of the disk.

The rear or trailing end of the disk shoe 3 terminates in a lateral projection or fluke 8, which is shaped somewhat like the mold board of an ordinary plow and is disposed in such relation to other parts of the disk that it completes the inversion of the furrow slice and then pushes the loosened earth sidewise to dress up the outer face of the newly cut furrow, as at 10, Fig. 4. This prevents the loose earth from falling back into the bottom of the new furrow. This fluke or mold board 8, as shown in Fig. 2, does not extend outward quite to the edge of the disk, but is set back a short distance, as shown at 9.

The steel shoe or facing is long enough to wrap almost completely around the cast iron support or hub, thereby making substantially one complete helical turn. It may be secured in place by suitable rivets, bolts or the like, and is removable for renewal or sharpening.

When the disk above described is in normal use as a part of a power driven plow, it is driven in the direction shown by the arrow, Fig. 2 and its action on the soil consists in cutting loose a slice or clod of earth and then turning the slice over to renew the surface of the field. During this rotary motion of the disk, it is advanced across the field by the forward movement of the plow structure on which it is carried. Preferably the disk rotates faster than the plow moves forward, for this gives freedom at the front of the plow and insures prompt sidewise motion of the earth slice and complete renewal of the field surface.

What I claim as new and desire to secure by United States Letters Patent, is:

1. A plow disk consisting of a concaved surface of substantially one complete helical turn which terminates in a lateral projection for turning over the furrow slice, said disk having its front part warped down to form a substantially straight radial cutting edge.

2. A plow disk consisting of a concaved helical surface of substantially one complete helical turn and terminating in a lateral projection for turning over the furrow slice, said disk being of substantially uniform radius, and having its front portion warped down to form a substantially radial cutting edge at the forward end of the disk.

3. A plow member consisting of a casting having a helical flange, a steel shoe substantially encircling said casting and having a helical concaved shape for the movement of earth, said shoe having its front edge shaped to form a radial cutting edge and having its rear end provided with a lateral projection for turning earth loosened by said disk.

4. A plow member comprising a casting having a helical concave flange, a steel shoe fitted to said flange and projecting beyond the same, said shoe being of concave shape and substantially encircling said casting, the front edge of said shoe being warped downward to form a substantially radial cutting edge, and the rear of said shoe being warped laterally to form a fluke for turning the furrow slice.

5. A plow member consisting of a hollow hub carrying a helical concave flange, a concaved steel shoe fitted to said flange and projecting beyond the edge thereof, said shoe being of helical shape and substantially encircling said casting and removable therefrom, the front edge of said shoe being warped inward to form a cutting edge and the rear end of said shoe being warped outward to form a lateral projection for turning over the furrow slice.

In witness whereof, I hereunto subscribe my name to this specification in the presence of two witnesses.

JAY VAN VRANKEN.

Witnesses:
HAROLD HANSEN,
JOS. J. BURR.